United States Patent
Alpers

[11] 3,712,562
[45] Jan. 23, 1973

[54] SECTOR GATING CIRCUIT

[75] Inventor: Frederic C. Alpers, Riverside, Calif.

[73] Assignee: The United States of America as represented by the Secretary of the Navy

[22] Filed: May 19, 1964

[21] Appl. No.: 369,055

[52] U.S. Cl. ............244/3.15, 244/3.16, 244/3.19, 250/203, 343/118, 343/119
[51] Int. Cl. .............................................F42b 15/02
[58] Field of Search....244/14, 14.1, 14.2, 14.4, 14.5, 244/14 E, 14 H–14 K, 3.1, 3.15, 3.16, 3.18, 3.19, 3.20; 343/118, 119; 250/203

[56] References Cited

UNITED STATES PATENTS 3,242,495  3/1966  Kohl..................................343/118 X

*Primary Examiner*—Malcolm F. Hubler
*Attorney*—Q. Baxter, J. M. St. Amand and T. M. Phillips

EXEMPLARY CLAIM

In a circuit for discriminating against signals from extraneous targets received by a tracking device in which the planes of direction finding are rotated, such as the seeker of a rolling missile, the combination comprising:
  a. a first input terminal for receiving target signals from one channel of a target seeker,
  b. a second input terminal for receiving target signals from another channel of said target seeker,
  c. roll rate circuit means for producing delayed signals synchronized to the roll of said missile,
  d. first gate circuit means for passing signals received at said first input terminal when signals present at said second input terminal are at a null and being responsive to the delayed signal of said roll rate circuit means for blocking signals received at said first circuit means,
  e. second gate circuit means for passing signals received at said second input terminal when signals present at said first input terminal are at a null and being responsive to the delayed signals of said roll rate circuit means for blocking signals received at said second circuit means.

5 Claims, 3 Drawing Figures

FREDERICK C. ALPERS
INVENTOR.

SECTOR GATING CIRCUIT

The invention herein described may be manufactured and used by or for the Government of the United States of America for governmental purposes without the payment of any royalties thereon or therefor.

The present invention relates to sector gating circuits and more particularly to sector gating circuits for missile seekers or target tracking devices wherein only signals of desired targets are accepted and all other signals are rejected.

In rolling missiles, such as the BULLPUP, where any two-axis seeker placed in and fixed with respect to the nose of the missile would have its planes of effective direction-finding rotating along with the rotation of the missile, or in other target tracking devices where the planes of direction finding are rotated, the present invention provides a means of permitting only the signals received from a target of interest to be fed to the missile guidance or target tracking system. More specifically, where a two-plane monopulse-type seeker is incorporated in the nose of a missile and, as is customary, the two planes of action appear at right angles to each other, a nulling of the directional information received in one of the planes of the seeker at some particular roll angle is utilized to gate the information received simultaneously in the other plane of the seeker. This action has the effect of gating and thereby selecting only signals emanating or reflected from a source that lies within a particular sector of the solid angle surrounding the roll axis of the missile. The present invention thus provides a sector gating circuit for target discrimination in missiles which continuously roll as they fly toward their targets. It is particularly useful where the missile flies an intercept course or a deviated pursuit course so that the missile longitudinal axis is not maintained in alignment with the line of sight from the missile to the target, and where signals from various sources reach the missile with some time, frequency, or other separation basis so that the sector gating circuits may, in effect, examine each individual signal independently.

Accordingly, an object of the present invention is the provision of a means of discriminating against undesired targets.

Another object of the invention is to provide a means of discriminating against undesired target signals in a two-axis seeker mounted in a continuously rolling missile.

A further object of the invention is the provision in a seeker or a tracking device of an angle gating circuit which permits received signals that are examined individually to be accepted only if they are propagated from a source which lies within a selected sector of the 360° cone of rotation ahead of the device.

Other objects and many of the attendant advantages of this invention will become readily appreciated as the same becomes better understood by reference to the following detailed description when considered in connection with the accompanying drawings wherein.

To serve for illustration only and to assist in describing the invention, it is assumed that the sector gating circuit is to be used with a two-plane monopulse-type seeker which is incorporated in the nose of a rolling missile and which receives pulse type signals separated in time that are propagated to the seeker from various sources or objects within its field of view. It is further assumed for purposes of describing the invention that the seeker provides three outputs: a single reference output whenever an incoming signal reaches the seeker input, and an output directional signal for each plane of the two planes of measurement, which output directional signal is of positive polarity when the source of that signal lies to one side of the seeker axis in the respective plane of measurement, is zero when the source is on axis in that plane, and is of negative polarity when the source lies to the other side of the seeker axis in that plane. The output directional signals associated with the two planes of measurement will be identified as the signals in Channel A and in Channel B respectively.

Figure 1:
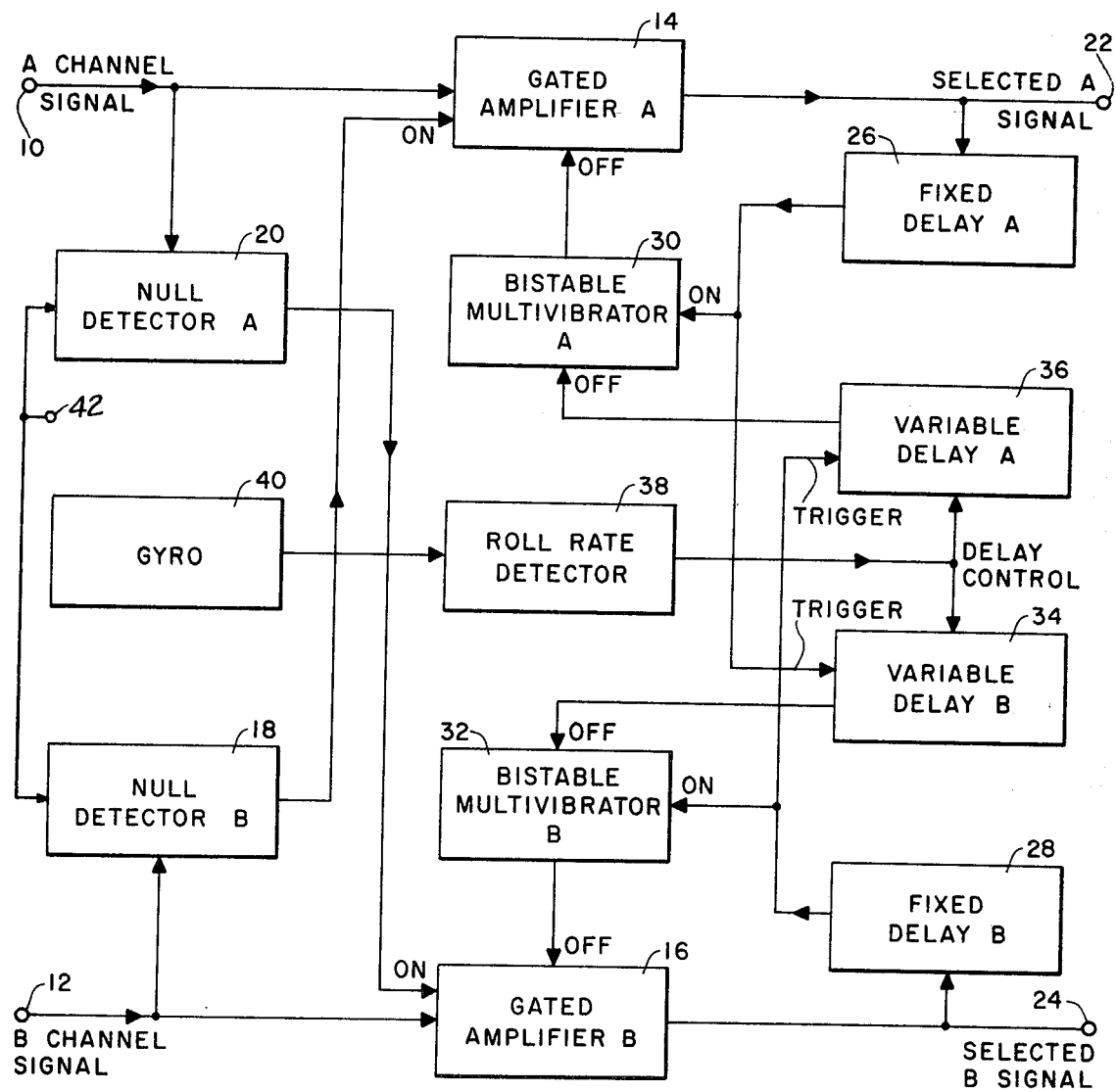
FIG. 1 is a block diagram of a preferred embodiment of the invention.

Referring to FIG. 1 there is shown an input terminal 10 for receiving signals from Channel A of the seeker and an input terminal 12 for receiving signals from Channel B of the seeker. Signals received at terminals 10 and 12 are fed as inputs to gated amplifiers 14 and 16 respectively. A null detector 18 is coupled between input terminal 12 and the "on" gating terminal of gated amplifier 14 and in a similar manner a null detector 20 is coupled between the input terminal 10 and the "on" gating terminal of gated amplifier 16. There is also shown an input terminal 42 for receiving a reference signal from the seeker, and signals received at terminal 42 are fed as gate inputs to null detectors 18 and 20. The output of gated amplifier 14 is coupled to an output terminal 22 while the output of gated amplifier 16 is coupled to an output terminal 24. A portion of the output signal from each of gated amplifiers 14 and 16 are fed through fixed delays 26 and 28 respectively as the "on" signals to bistable multi-vibrators 30 and 32. The output from fixed delay 26 is also coupled through variable delay 34 as the "off" signal for bistable multi-vibrator 32 and the output of fixed delay 28 is coupled through variable delay 36 as the "off" signal to bistable multi-vibrator 30. Variable delays 34 and 36 are controlled by the output from roll rate detector 38 which derives its output from the missile gyro 40.

Figure 2:
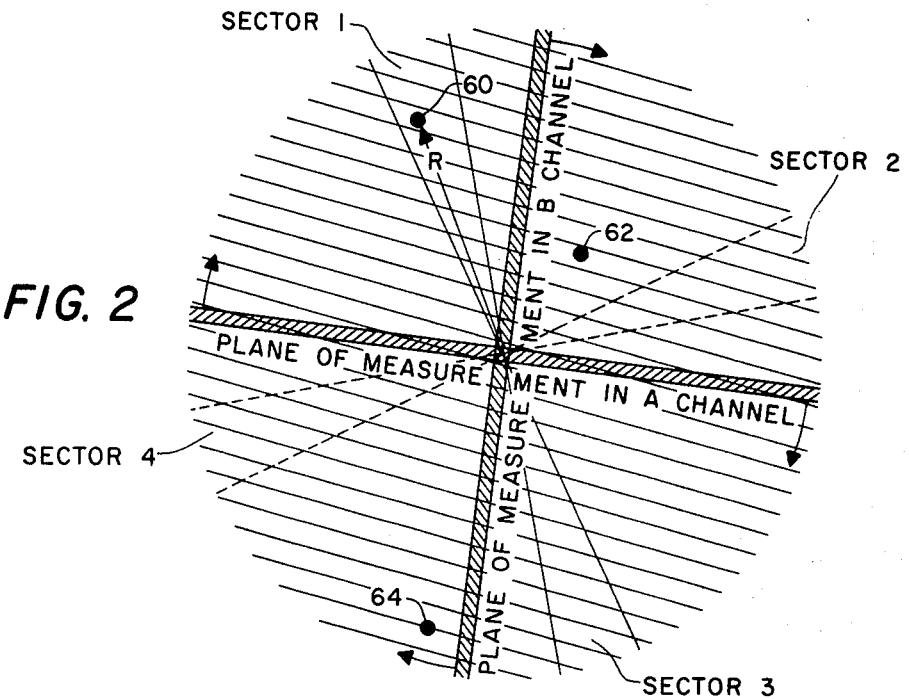
FIG. 2 is a diagram illustrating the instantaneous angular relationships of the action forward from the nose of the missile.

Signals are received in the seeker in two planes at right angles to each other as shown in FIG. 2. These planes are designated as plane of measurement A and plane of measurement B to correspond to the two processing Channels A and B. Planes of measurement in Channels A and B are fixed with respect to the seeker, which in turn is fixed to the missile, and the planes therefore rotate as the missile rotates with respect to spatial coordinates and with respect to signal sources that are fixed in space. The assumed direction of rotation of the planes is indicated by the arrows. The direction due-forward of the nose of the missile is defined by the intersection of the two planes of measurement. For the particular angle of rotation shown in FIG. 2 the measurement in Channel A indicates generally whether a target lies to the right or left of the missile nose position and the measurement in Channel B tells generally whether a target lies up or down from the nose position. However, as indicated by the arrows, planes A and B are changed through the rolling action of the missile so that at a later time Channel A will measure the up and down coordinates and Channel B the right and left, and so on.

As the missile rolls, the plane of measurement in Channel A rotates to the point where it begins to come into line with Sector 1 and Sector 3 as shown in FIG. 2. For purposes of illustration it is assumed that Sector 1 is about 15° in width which contains a target of interest, 60. As the plane of measurement of Channel A comes into coincidence with Sectors 1 and 3, the corresponding plane in Channel B comes into coincidence with Sectors 2 and 4, and while the two planes of measurement are rotating there is continuously generated information concerning the coordinates of the several targets with respect to these planes. As the plane of measurement of Channel B comes into coincidence with Sectors 2 and 4, the measurement shows that the target 60 is in line with the nose of the missile so far as measurement in this particular plane is concerned and the seeker output directional signal received from target 60 becomes zero for this orientation of plane of measurement B. When this happens, the absolute amplitude of the output of the monopulse type seeker in plane A will reach a maximum that is indicative of the radial angular displacement R of target 60 from the direction due-forward of the nose of the missile.

Figure 3:
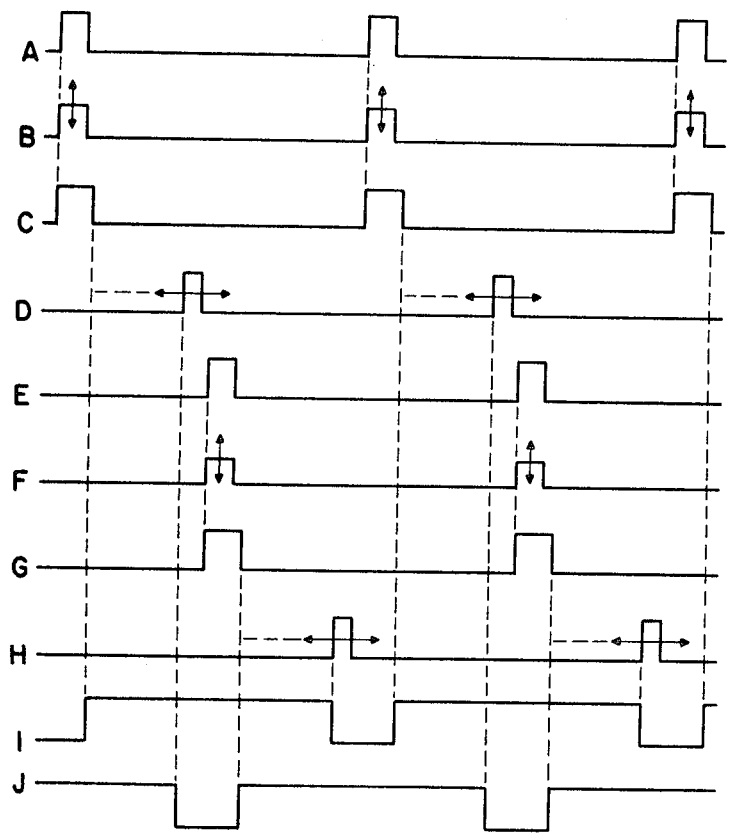
FIG. 3 is a diagram showing the various waveforms used in the description of FIG. 1.

When the arrival of a signal at the input of the seeker is indicated by the occurrence of a reference pulse at terminal 42 but simultaneously the directional signal in plane B which is fed as an input signal at terminal 12 is zero, null detector 18 responds and generates pulse A as shown in FIG. 3. The output pulse A from null detector 18 is fed to and gates amplifier 14 "on" when the output of Channel A is at peak amplitude; i.e., when the plane of measurement in Channel B is in coincidence with Sectors 2 and 4, target 60 will project on the plane of measurement of Channel A at its maximum distance from the center or nose-on position. In this way the null in the signal of Channel B when it passes through Sectors 2 and 4 which are orthogonal to Sectors 1 and 3 is used as an output to determine when the position of target 60 has reached a maximum so far as the measurement of its position in Channel A is concerned. In a similar manner the measurement of the position of target 60 in Channel B can be determined as the missile continues to rotate and the plane of measurement in Channel A comes into coincidence with Sectors 2 and 4. At that time the orthogonal Channel B will be in coincidence with the orthogonal Sectors 1 and 3.

In operation, signals which would arise from all targets to which the seeker (not shown) is tuned are received at terminal 10 and fed to gated amplifier 14 and null detector 20. Gated amplifier 14 is controlled by a signal received from null detector 18 which turns amplifier 14 on when the B Channel is in line with Sectors 2–4 as shown in FIG. 1. However, a null output indication from detector 18 will also occur at missile rotational positions other than when plane B falls within Sectors 2 and 4; e.g., when plane A crosses the position of extraneous signal source 62 or of extraneous signal source 64 as illustrated in FIG. 2. Such null output signals which are in no way associated with target 60 would turn amplifier 14 on except for the additional control supplied from multivibrator 30 which switches the amplifier off during the time duration target 60 is not being scanned. Bistable multivibrator 30 is turned on by the output from fixed delay 26 which is triggered by the first signal from target 60 that reaches terminal 22 as plane of measurement A passes through Sectors 1–3. Fixed delay 26 then in effect determines the width of Sectors 1–3. In a corresponding manner fixed delay 28, which would be made identical to fixed delay 26, determines the width of Sectors 1–3 as the plane of measurement in Channel B passes through this sector.

Delayed signals from fixed delay 28 are used to trigger variable delay 36, which provides a further delayed signal to turn off bistable multivibrator 30. Amplifier 14 is now ready again to receive a signal from null detector 18; i.e., amplifier 14, after being turned off for a period of time through the action of bistable multivibrator 30, is then made ready to function again when a proper output from a chosen target through null detector 18 is expected, but it does not actually go on again until the output from null detector 18 arrives.

In understanding the timing of the various pulses to determine for which period of time bistable multivibrator 30 is on and gated amplifier 14 is prohibited from passing signals, consider that the period of timing begins as the plane of measurement of Channel A leaves Sectors 1–3 ((FIG. 2) and the signal prohibiting period continues until a certain variable delay after plane B has likewise passed through Sectors 1–3 and approaches Sectors 2–4. If variable delay 36 is adjusted such that is is equal in time to one-quarter of the roll cycle of the missile minus the delay of fixed delay 26, gated amplifier 14 will again be ready to receive signals when plane of measurement A has rotated through nearly 180° and is again entering Sectors 1–3. Variable delay 36 is controlled by the combined action of roll rate detector 38 and gyroscope 40. Gyroscope 40 measures the roll of the missile and roll rate detector 38 provides a bias voltage for controlling the delay of variable delay 36.

The action through Channel B corresponds directly to that in Channel A except that it is displaced 90° with respect to the roll position of the missile; i.e., the gating in Channel B is controlled by a signal from null detector 20 as the plane of measurement in the Channel A passes through Sectors 2 and 4, and then amplifier 16 is prohibited from further passage of signals until bistable multivibrator 32 is turned off by an output signal from variable delay 34.

For a further understanding of the operation of the invention, reference may be had to FIG. 3. Waveform A is the output of null detector 18 which turns on gated amplifier 14. While gated amplifier 14 is on, an output in the form of waveform B appears which will have a varying amplitude depending on the strength of the signal in Channel A, which strength in turn is determined by the angular displacement between the axis of the seeker system and the position of target 60. The amplitude of the output of amplifier 14 is the directional information with respect to target 60, and the timing of the occurrence of waveform B tells the position of target 60 with respect to the rotation of the missile. Waveform C is the output of fixed delay 26 and the width of this waveform adjusted to give the desired width of Sectors 1–3 insofar as the Channel A signal is concerned. Waveform D is a delayed output pulse that follows the trailing edge of waveform C by a delay which is determined by variable delay 36. Waveforms E, F, G and H correspond to Waveforms A, B, C and D respectively except that they are delayed by 90° through the rotation cycle and they apply to Channel B in the same way as the previous waveforms apply to Channel A. Waveform I is the output of bistable multivibrator 30 which is turned on by the trailing edges of waveform C and turned off again by the leading edge of waveform H. The time between the turning on and turning off of multivibrator 30 determines the time during which the signals from extraneous sources, i.e., sources other than target 60, are prohibited from passing through the sector gating circuit and affecting the direction of the flight of the missile. Waveform J is generated when multivibrator 32 is turned on by the trailing edge of waveform G and is turned off again by waveform D, and controls the gating in Channel B in the same way that waveform I controls the gating in the Channel A.

Obviously many modifications and variations of the present invention are possible in the light of the above teachings. It is therefore to be understood that within the scope of the appended claims the invention may be practiced otherwise than as specifically described.

What is claimed is:

1. In a circuit for discriminating against signals from extraneous targets received by a tracking device in which the planes of direction finding are rotated, such as the seeker of a rolling missile, the combination comprising:
   a. a first input terminal for receiving target signals from one channel of a target seeker,
   b. a second input terminal for receiving target signals from another channel of said target seeker, c. roll rate circuit means for producing delayed signals synchronized to the roll of said missile,
   d. first gate circuit means for passing signals received at said first input terminal when signals present at said second input terminal are at a null and being responsive to the delayed signal of said roll rate circuit means for blocking signals received at said first circuit means,
   e. second gate circuit means for passing signals received at said second input terminal when signals present at said first input terminal are at a null and being responsive to the delayed signals of said roll rate circuit means for blocking signals received at said second circuit means.

2. The circuit of claim 1 wherein said first and second circuit means are first and second gated amplifiers respectively.

3. The circuit of claim 2 wherein a null detector is coupled between said second input terminal and said first gated amplifier for gating said first gated amplifier on in response to a null condition in said null detector.

4. The circuit of claim 3 wherein circuit control means are coupled to said first gated amplifier for turning off said first gated amplifier in response to an output signal from said first gated amplifier that has been time delayed by a predetermined amount.

5. The circuit of claim 1 wherein said first and second circuit means comprise:
   a. a first gated amplifier having a first input coupled to said first input terminal, second and third inputs, and an output,
   b. a first null detector coupled between said second input terminal and the second input of said first gated amplifier,
   c. a first fixed delay circuit having an input coupled to the output of said first gated amplifier and having an output,
   d. a first bistable multivibrator having a first input coupled to the output of said first fixed delay, a second input and an output coupled to the third input of said first gated amplifier,
   e. roll rate detector means having an output proportional to the rate of rolling of said missile,
   f. first variable delay means having a first input coupled to said roll rate detector means, a second input and an output coupled to the second input of said first bistable multivibrator,
   g. a second gated amplifier having a first input coupled to said second input terminal, second and third inputs and an output,
   h. a second null detector coupled between said first input terminal and the second input of said second gated amplifier,
   i. a second fixed delay circuit having an input coupled to the output of said second gated amplifier and having an output coupled to the second input of said first variable delay means,
   j. a second bistable multivibrator having a first input coupled to the output of said second fixed delay, a second input and an output coupled to the third input of said second gated amplifier,
   k. second variable delay means having a first input coupled to said roll rate detector means, a second input coupled to the output of said first fixed delay circuit and an output coupled to the second input of said second bistable multivibrator.

* * * * *